No. 671,572. Patented Apr. 9, 1901.
J. V. WASHBURNE.
FASTENER FOR GLOVES, &c.
(Application filed Aug. 1, 1900.)
(No Model.)
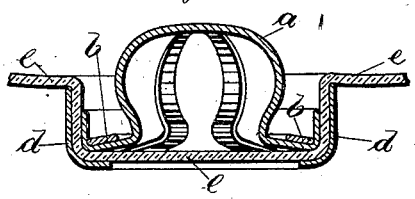
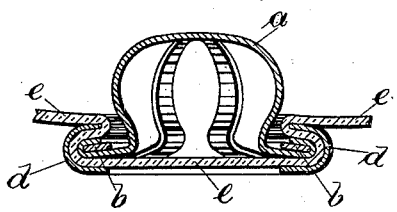
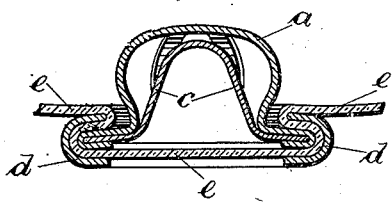
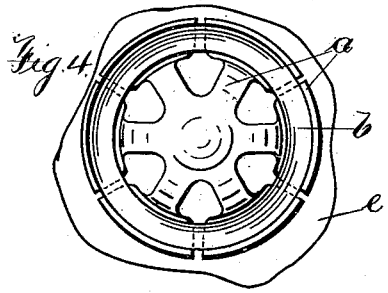
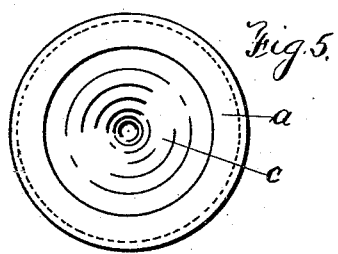
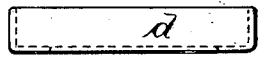
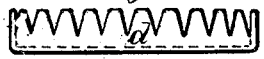
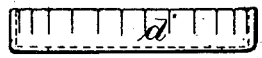
Witnesses
INVENTOR
James V. Washburne
PER L. W. Serrell & Son
Attys

UNITED STATES PATENT OFFICE.

JAMES V. WASHBURNE, OF WATERBURY, CONNECTICUT.

FASTENER FOR GLOVES, &c.

SPECIFICATION forming part of Letters Patent No. 671,572, dated April 9, 1901.

Application filed August 1, 1900. Serial No. 25,500. (No model.)

*To all whom it may concern:*

Be it known that I, JAMES V. WASHBURNE, a citizen of the United States, residing at Waterbury, in the county of New Haven and State of Connecticut, have invented an Improvement in Fasteners for Gloves, Garments, &c., of which the following is a specification.

My invention relates to snap-fasteners for wearing-apparel generally, including gloves and garments, said snap-fasteners employing two connectable portions, the one a stud member and the other a socket member.

In carrying out my invention and for either the stud or socket member I employ an attaching part and an inner part, and the flexible material intervenes and extends beyond these parts, and the free edge of the attaching part is turned inwardly over the flexible material and base of the inner part. For the inner part I prefer to employ a skeleton spring-stud formed of arms radiating from a common center and a centrally-arranged support embraced by the ends of said arms. For the attaching part I prefer to employ a circular metal body having side portions and a receiving-angle and preferably an open center, although the open center is not material. The skeleton spring-stud is connected to the centrally-arranged support by the ends of its radiating arms being turned over and embracing the outer edge of the said support, and these parts are received down into the attaching part, with the flexible material intervening, and the free edge of the attaching part is turned inwardly over the flexible material and the base of the inner part.

My present invention relates particularly to the stud member, and in connection therewith the centrally-arranged support may be a ring, over the periphery of which the ends of the radiating arms of the skeleton spring-stud are bent, or it may be a flanged dome, over the edge of which flange the ends of the said arms are bent, and the free edge of the attaching part may be notched or scalloped.

In the drawings, Figure 1 is a vertical section of the parts previous to overturning the edge of the attaching part. Fig. 2 shows the parts attached. Fig. 3 shows the parts in connection with a flanged dome. Fig. 4 is a plan of the skeleton spring-stud and centrally-arranged support according to Fig. 1. Fig. 5 is an inverted plan of the parts according to Fig. 3, and Figs. 6, 7, and 8 represent side elevations of the attaching part.

$a$ represents the skeleton spring-stud, formed of radiating arms from a common center and cupped up to shape. This part is similar in all the figures, the said arms being shown of the same width throughout and the extreme ends tapering. The ends of these arms are adapted to embrace and engage a centrally-arranged support. In Figs. 1 and 2 this centrally-arranged support is shown in the form of a ring $b$, overlying the arms and received within the boundary formed by the ends of said arms being upturned, as in Fig. 1.

$d$ represents the attaching part, the skeleton spring-stud $a$, together with the centrally-arranged support or ring $b$, being pressed down, with the flexible material $e$, into the attaching part, so that the side portions of the attaching part surround the ring $b$ and the ends of the skeleton stud, with the flexible material intervening.

By the use of suitable dies the one holding the attaching part and the other forcing down the spring-stud and the centrally-arranged support, with the flexible material $e$, the free edges of the attaching part are turned inwardly with the flexible material $e$ over the edge of the centrally-arranged support, and at the same time turning the ends of the radiating arms over the same support or ring $b$ into the position shown in Fig. 2, in which the inner and outer parts forming the stud member are fastened to the flexible material $e$.

The centrally-arranged support or ring $b$ has an inflexible edge acting as an inner wall or stay, while the free edge of the attaching part is turned over the same. Where the centrally-arranged support is in the form of a flanged dome $c$, Figs. 3 and 5, the free ends of the radiating arms of the skeleton spring-stud $a$ are first downturned and bent under the edge of the flange of the said dome, so that the spring-stud and the dome are thus connected together, the said dome acting as a support to the spring-stud to prevent the outer end thereof accidentally being inwardly crushed. These connected parts are, with the flexible material, carried down into the attaching part, and by the said suitable dies the free edge of the attaching part is turned inwardly with the flexible material e over the inflexible edge of the flanged dome, so that, as shown in Fig. 3, the parts are connected for use, and the attaching part d, as in Fig. 6, may be made with a continuous free edge, or it may be made, as in Fig. 7, with the notched free edge, or, as in Fig. 8, with a scalloped free edge. The notched and scalloped edges have, however, an advantage over the continuous edge, because requiring less force to inturn the said edges in securing the attaching part to the skeleton spring-stud and the centrally-arranged support.

The attaching part is advantageously made with an open center, through which the flexible material e is visible. This presents a pleasing appearance. Besides, in the stud member where the surface of the attaching part would come next to the flesh there is a less surface of metal, with the probability of the flexible material e instead of the metal bearing upon the flesh.

I claim as my invention—

1. In a stud-and-socket fastening device for wearing-apparel, the combination with the flexible material, of a skeleton stud formed from arms radiating from a common center and bent up to shape, a centrally-arranged support having an edge embraced by the overturned free ends of said arms, and an attaching part receiving the skeleton spring-stud and centrally-arranged support with the intervening flexible material, and having the free edge of the attaching part turned inwardly over the flexible material and edge of the inner part, substantially as specified.

2. In a stud-and-socket fastening device for wearing-apparel, the combination with the flexible material, of a skeleton spring-stud with arms radiating from a common center cupped up to shape, a centrally-arranged support in the form of an inflexible ring or flange with the free ends of said arms turned over and embracing the outer edge of the said centrally-arranged support, and an attaching part having side portions and a receiving-angle, the said spring-stud and centrally-arranged support being received with the flexible material into the attaching part with the flexible material intervening and extending beyond and the free edge of the attaching part turned inwardly over the flexible material and the centrally-arranged support, substantially as specified.

3. In a stud-and-socket fastening device for wearing-apparel, the combination with the imperforate flexible material, of a skeleton spring-stud with arms radiating from a common center cupped up to shape with the free ends of the arms bent upwardly, a ring forming a centrally-arranged support surrounding the spring-stud within the upturned ends of the arms, an attaching part having side portions and a receiving-angle, and the spring-stud with the upturned arms and the ring received with flexible material into the attaching part with the flexible material intervening and extending beyond and the free edge of the attaching part turned inwardly over the flexible material and the said ring and at the same time overturning the points of the said arms upon the said ring, substantially as and for the purposes set forth.

4. In a stud-and-socket fastening device for wearing-apparel, the combination with the imperforate flexible material, of a skeleton spring-stud with arms radiating from a common center cupped up to shape, a centrally-arranged support having an edge embraced by the overturned ends of said arms, and an attaching part having side portions with a divided edge and a receiving-angle, the said spring-stud and support received with the flexible material into the attaching part with the flexible material intervening and extending beyond and with the divided edge of the attaching part turned inwardly over the flexible material and edge of the inner part, substantially as specified.

5. In a stud-and-socket fastening device for wearing-apparel, the combination with the imperforate flexible material, of a skeleton spring-stud with arms radiating from a common center cupped up to shape, a centrally-arranged support embraced by the overturned ends of said arms, and an attaching part having side portions with a divided edge and a receiving-angle, and an open center through which the flexible material is visible, substantially as specified.

Signed by me this 12th day of July, 1900.

JAMES V. WASHBURNE.

Witnesses:
 GEO. T. PINCKNEY,
 BERTHA M. ALLEN.